(12) United States Patent
Shook et al.

(10) Patent No.: US 11,174,891 B2
(45) Date of Patent: Nov. 16, 2021

(54) BOLTS AND BOLT CAPTURE SYSTEMS

(71) Applicant: Hamilton Sundstrand Corporation, Charlotte, NC (US)

(72) Inventors: Ryan Shook, Rockford, IL (US); Cyle Teal, Colorado Springs, CO (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 230 days.

(21) Appl. No.: 16/447,236

(22) Filed: Jun. 20, 2019

(65) Prior Publication Data

US 2020/0400185 A1    Dec. 24, 2020

(51) Int. Cl.
*F16B 21/00*    (2006.01)
*F16B 41/00*    (2006.01)

(52) U.S. Cl.
CPC .................... *F16B 41/002* (2013.01)

(58) Field of Classification Search
CPC ...................................................... F16B 41/002
USPC .......................................... 411/337, 445, 999
See application file for complete search history.

(56) References Cited

U.S. PATENT DOCUMENTS

| | | | | |
|---|---|---|---|---|
| 2,366,510 A | * | 1/1945 | Frank ..................... | F16B 27/00 411/445 |
| 3,480,299 A | * | 11/1969 | Henderson .............. | F16L 15/08 285/4 |
| 5,056,974 A | * | 10/1991 | Dolin ...................... | F16B 39/10 411/102 |
| 7,726,926 B2 | * | 6/2010 | Lemire ............... | F16B 13/0808 411/340 |
| 8,814,485 B2 | * | 8/2014 | Gleason .............. | F16B 13/0808 411/344 |
| 2009/0191019 A1 | | 7/2009 | Billings | |
| 2013/0084143 A1 | * | 4/2013 | Bernhard .............. | F16B 41/002 411/82.2 |
| 2014/0101923 A1 | * | 4/2014 | Clark .................... | F16B 41/002 29/525.11 |
| 2019/0003511 A1 | * | 1/2019 | Leon ..................... | B64C 39/024 |
| 2019/0293108 A1 | * | 9/2019 | Sandwall ............... | F16B 43/00 |

FOREIGN PATENT DOCUMENTS

| | | |
|---|---|---|
| GB | 1445153 A | 8/1976 |
| GB | 2362936 A | 12/2001 |
| JP | 2004183817 A | 7/2004 |
| JP | 2016156189 A | 9/2016 |

OTHER PUBLICATIONS

Extended European Search Report dated Jun. 23, 2020, issued during the prosecution of European Patent Application No. EP 19210745.6.

* cited by examiner

*Primary Examiner* — Gary W Estremsky
(74) *Attorney, Agent, or Firm* — Locke Lord LLP; Daniel J. Fiorello; Gabrielle L. Gelozin

(57) ABSTRACT

A bolt configured for preventing loss of the bolt during removal can include a bolt head, a bolt shaft extending from the bolt head in an axial direction, the bolt shaft including threads, and a bolt capture channel defined through the bolt head and the bolt shaft in the axial direction. The bolt capture channel can include a head opening and shaft opening.

15 Claims, 2 Drawing Sheets

BOLTS AND BOLT CAPTURE SYSTEMS

FIELD

This disclosure relates to bolts and bolt systems, e.g., for foreign object debris (FOD) prevention.

BACKGROUND

Bolts pose a serious foreign object debris (FOD) problem in aircraft maintenance. For example, bolts can be removed during maintenance and accidentally dropped into unreachable areas that can later cause damage. A positive way for capturing the bolts to prevent bolt loss is always desirable.

Such conventional methods and systems have generally been considered satisfactory for their intended purpose. However, there is still a need in the art for improved bolts and bolt capture systems. The present disclosure provides a solution for this need.

SUMMARY

A bolt configured for preventing loss of the bolt during removal can include a bolt head, a bolt shaft extending from the bolt head in an axial direction, the bolt shaft including threads, and a bolt capture channel defined through the bolt head and the bolt shaft in the axial direction. The bolt capture channel can include a head opening and shaft opening.

The bolt capture channel can be defined centrally (e.g., parallel to the bolt axis) through the bolt head and the bolt shaft. Any other suitable position for the bolt capture channel is contemplated herein.

In certain embodiments, the bolt can include a cable disposed in and through the bolt capture channel. A bolt shaft end of the cable can include a stop member configured to contact the bolt shaft to prevent the cable from being pulled out of the bolt capture channel. The stop member can be larger than (e.g., wider than the diameter of) the bolt capture channel such that the stop member cannot fit through the bolt capture channel.

In certain embodiments, the stop member can be a swage of the bolt shaft end of the cable. Any other suitable stop member (e.g., a bead attached to the cable) is contemplated herein.

The bolt head end of the cable can be configured to be connected to a structure that the bolt attaches to. The bolt head can include a hex shape or any other suitable shape. Any other suitable features for the bolt (e.g., a safety wire hole defined through the bolt head) are contemplated herein.

A method can include fabricating a bolt as disclosed herein. The method can include inserting a cable into the bolt capture channel. The method can include disposing a stop member on the bolt shaft end of the cable. Disposing a stop member can include swaging an end of the cable to be larger than the bolt capture channel.

Fabricating the bolt can include drilling the bolt capture hole through the bolt head and the bolt shaft. Any other suitable method to fabricate the bolt with the bolt capture channel (e.g., additive manufacturing, molding) is contemplated herein.

In certain embodiments, inserting the cable through a plurality of bolts. Any suitable number of bolts is contemplated herein.

A system can include a structure (e.g., an aircraft structure) having a bolt hole, a bolt as disclosed herein (e.g., as described above) configured to be disposed in the bolt hole, and a cable disposed through the bolt capture channel of bolt. A bolt shaft end of the cable can include a stop member configured to contact the bolt shaft to prevent the cable from being pulled out of the bolt capture channel. The bolt head end of the cable can be attached to the structure.

The stop member can be any suitable stop member disclosed herein, e.g., as described above. The bolt can be threaded into the bolt hole of the structure.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
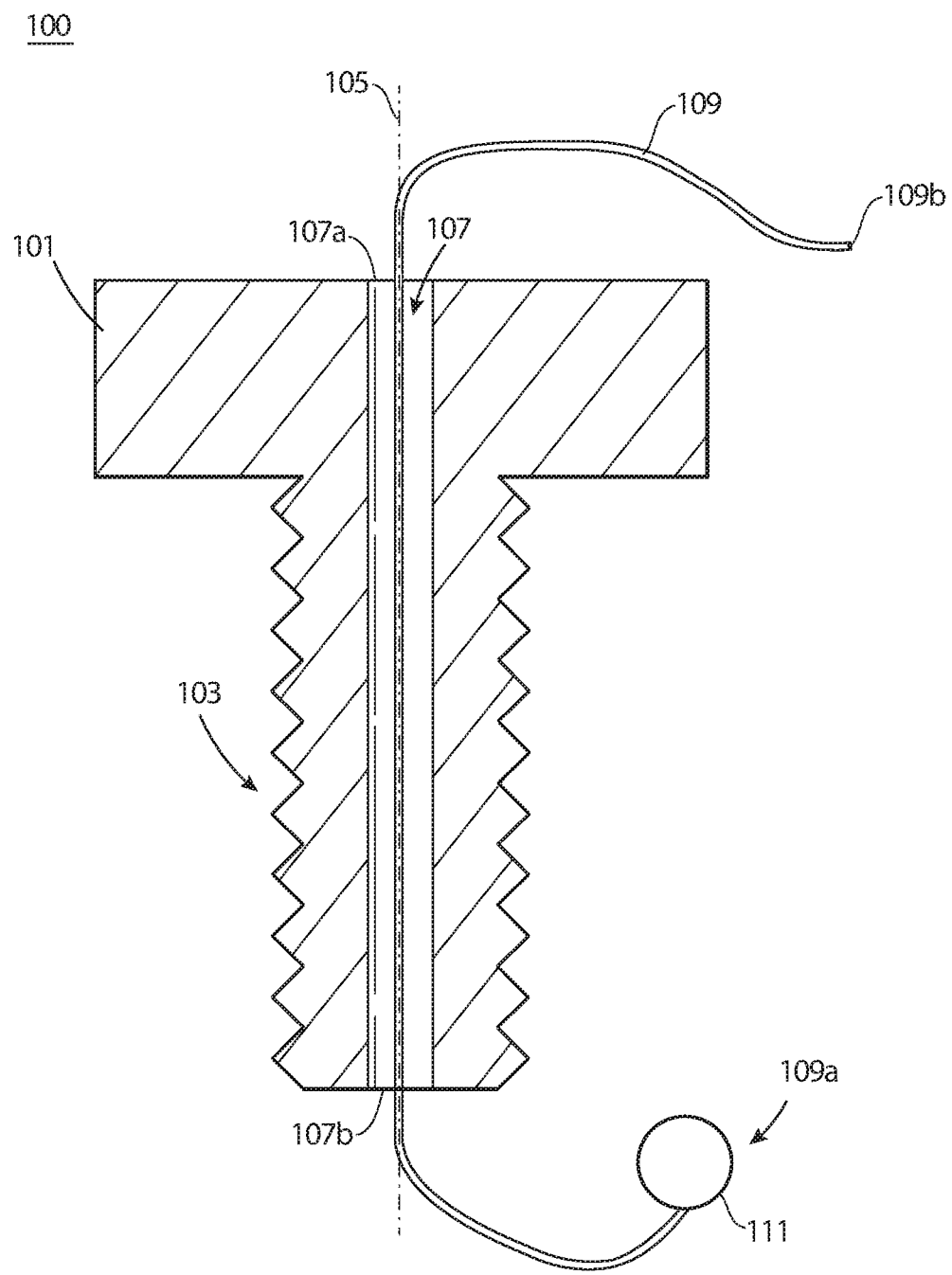
FIG. 1 is a cross-sectional view of an embodiment of a bolt in accordance with this disclosure.

Reference will now be made to the drawings wherein like reference numerals identify similar structural features or aspects of the subject disclosure. For purposes of explanation and illustration, and not limitation, an illustrative view of an embodiment of a bolt in accordance with the disclosure is shown in FIG. 1 and is designated generally by reference character 100. Other embodiments and/or aspects of this disclosure are shown in FIG. 2.

Figure 2:
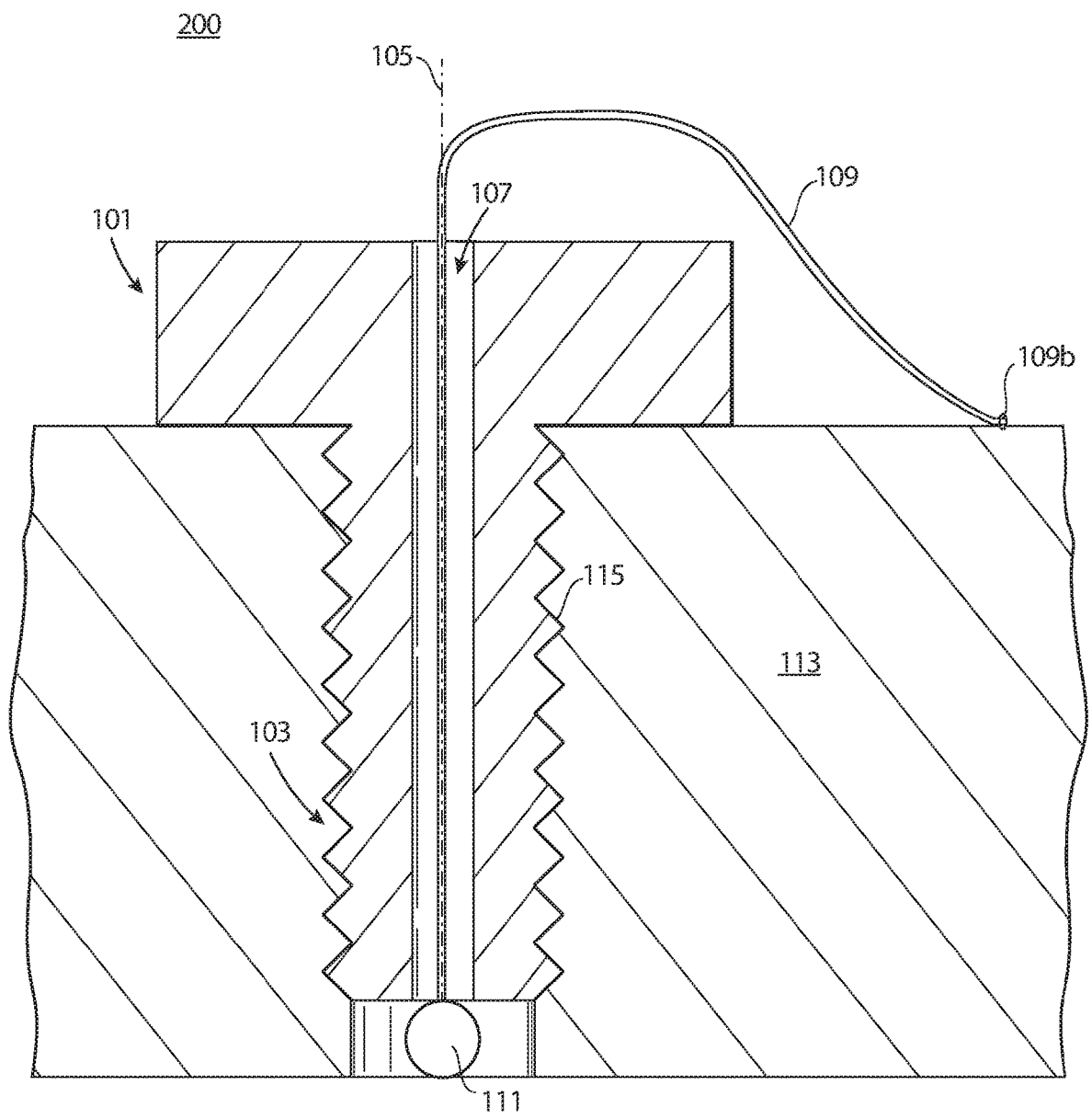
FIG. 2 is a cross-sectional view of a system in accordance with this disclosure, showing the bolt of FIG. 1 disposed in an embodiment of a structure.

Referring to FIGS. 1 and 2, a bolt 100 configured for preventing loss of the bolt 100 during removal can include a bolt head 101 and a bolt shaft 103 extending from the bolt head 101 in an axial direction (e.g., along bolt axis 105). The bolt shaft 103 can include threads (not shown for simplicity) on an outer diameter thereof.

The bolt 100 can include a bolt capture channel 107 defined through the bolt head 101 and the bolt shaft 103 in the axial direction. The bolt capture channel 107 can include a head opening 107a and shaft opening 107b.

The bolt capture channel 107 can be defined centrally (e.g., parallel to the bolt axis 105) through the bolt head 101 and the bolt shaft 103, e.g., as shown. Any other suitable position for the bolt capture channel 107 (e.g., off center, but still parallel with the bolt axis 105) is contemplated herein.

In certain embodiments, the bolt 100 can include a cable 109 disposed in and through the bolt capture channel 107. The cable 109 can include metallic cable, fishing line, and/or any other suitable material.

A bolt shaft end 109a of the cable 109 can include a stop member 111 configured to contact the bolt shaft 103 to prevent the cable from being pulled out of the bolt capture channel 107. In certain embodiments, the stop member 111 can be larger than (e.g., wider than the diameter of) the bolt capture channel 107 such that the stop member 111 cannot fit through the shaft opening 107b and/or the bolt capture channel 107.

In certain embodiments, the stop member 111 can be a swage of the bolt shaft end 109a of the cable 109. Any other suitable stop member 111 (e.g., a bead attached to the cable 109) is contemplated herein.

The bolt head end 109b of the cable 109 can be configured to be connected to a structure 113 (e.g., as shown in FIG. 2) that the bolt 100 attaches to. The bolt head 101 can include a hex shape or any other suitable shape. Any other suitable features for the bolt 100 (e.g., a safety wire hole defined through the bolt head 101) are contemplated herein.

As used herein, the term "bolt" is defined as any suitable fastener including, but not limited to, a socket head bolt, a screwdriver headed bolt, a screw, or any other suitable fastener type that can include a bolt capture channel 107 as disclosed hereinabove. The bolt 100 can be made of any suitable material, e.g., steel, alloy, plastic, etc.

Referring to FIG. 2, a system 200 can include a structure 113 (e.g., an aircraft structure) having at least one bolt hole 115 (e.g., threaded to mate with bold 100), at least one bolt 100 as disclosed herein (e.g., as described above) configured to be disposed in the bolt hole 115, and a cable 109 disposed through the bolt capture channel 107 of the at least one bolt 100. A bolt shaft end of the cable can include a stop member configured to contact the bolt shaft to prevent the cable from being pulled out of the bolt capture channel. The bolt head end 109b of the cable 109 can be attached to the structure 113.

The stop member 111 can be any suitable stop member 111 disclosed herein, e.g., as described above. The bolt 100 can be threaded into the bolt hole 115 of the structure 113, e.g., as shown.

A method can include fabricating a bolt as disclosed herein. The method can include inserting a cable into the bolt capture channel. The method can include disposing a stop member on the bolt shaft end of the cable. Disposing a stop member can include swaging an end of the cable to be larger than the bolt capture channel.

Fabricating the bolt can include drilling the bolt capture hole through the bolt head and the bolt shaft. Any other suitable method to fabricate the bolt with the bolt capture channel (e.g., additive manufacturing, molding) is contemplated herein.

In certain embodiments, inserting the cable through a plurality of bolts. Any suitable number of bolts is contemplated herein.

Embodiments include a through-hole through the entire bolt. Embodiments allow bearing preload to the bottom of the hex head. Certain embodiments can include a traditional safety wire hole in the head which can be off center to allow safety wiring (e.g., to prevent backing out of bolt). A first end of the cable can be fastened to structure (e.g., via a washer, lasso loop, or any other suitable manner). Embodiment of the cable can keep the bolt tethered to the structure. The other end can include a swage and be configured to sit inside a bolt hole. This end can be the free end, and the swage can be bigger than channel. In certain embodiments, a single cable can be passed through multiple bolts and have a single swage end, for example.

Embodiment include a bolt with a hole formed down the axial length, which allows for the passage of a safety cable. The end of the cable that passes through the bolt can have a cable stay or ferrule attached to or formed on the end. The opposing end of the cable can be attached to the parent part that the bolt secures to, or to another adjacent fastener, for example. In certain embodiments, the cable is not attached directly to the bolt allowing the bolt to be turned freely without twisting the cable.

Embodiments can give a positive retention method for bolts when removed from a parent location, or prior to assembly of parent parts. The cable can give a retention path so that when a bolt is removed, the bolt can only then travel from the parent location a distance equal to the length of the cable. This can be a benefit in assembly or maintenance of parts in or near confined or complex spaces where the dropping of a single bolt could warrant significant labor to retrieve.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A bolt configured for preventing loss of the bolt during removal, comprising:
   a bolt head;
   a bolt shaft extending from the bolt head in an axial direction, the bolt shaft including threads;
   a bolt capture channel defined through the bolt head and the bolt shaft in the axial direction, the bolt capture channel including a head opening and shaft opening; and
   a cable disposed in and through the bolt capture channel, wherein the cable is disposed through the bolt capture channel of a plurality of bolts.

2. The bolt of claim 1, wherein the bolt capture channel is defined centrally through the bolt head and the bolt shaft.

3. The bolt of claim 1, wherein a bolt shaft end of the cable includes a stop member configured to contact the bolt shaft to prevent the cable from being pulled out of the bolt capture channel.

4. The bolt of claim 3, wherein the stop member is larger than the bolt capture channel such that the stop member cannot fit through the bolt capture channel.

5. The bolt of claim 4, wherein the stop member is a swage of the bolt shaft end of the cable.

6. The bolt of claim 3, wherein the bolt head end of the cable is configured to be connected to a structure that the bolt attaches to.

7. The bolt of claim 1, wherein the bolt head includes a hex shape.

8. A method, comprising:
   fabricating a bolt to include:
     a bolt head;
     a bolt shaft extending from the bolt head in an axial direction, the bolt shaft including threads; and
     a bolt capture channel defined through the bolt head and the bolt shaft in the axial direction, the bolt capture channel including a head opening and shaft opening;
   inserting a cable into the bolt capture channel;
   disposing a stop member on the bolt shaft end of the cable; and
   inserting the cable through a plurality of bolts.

9. The method of claim 8, wherein disposing a stop member includes swaging an end of the cable to be larger than the bolt capture channel.

10. The method of claim 8, wherein fabricating the bolt includes drilling the bolt capture hole through the bolt head and the bolt shaft.

11. A system, comprising:
   a structure having a bolt hole;
   a bolt configured to be disposed in the bolt hole having:
      a bolt head;
      a bolt shaft extending from the bolt head in an axial direction, the bolt shaft including threads; and
      a bolt capture channel defined through the bolt head and the bolt shaft in the axial direction, the bolt capture channel including a head opening and shaft opening; and
   a cable disposed through the bolt capture channel, wherein the cable is disposed through the bolt capture channel of a plurality of bolts, wherein a bolt shaft end of the cable includes a stop member configured to contact the bolt shaft to prevent the cable from being pulled out of the bolt capture channel, wherein the bolt head end of the cable is attached to the structure.

12. The system of claim 11, wherein the stop member is larger than the bolt capture channel such that the stop member cannot fit through the bolt capture channel.

13. The system of claim 12 wherein the stop member is a swage of the bolt shaft end of the cable.

14. The system of claim 13, wherein the bolt is threaded into the bolt hole.

15. The system of claim 14, wherein the bolt head includes a hex shape.

\* \* \* \* \*